United States Patent [19]

Zucker

[11] 4,431,960

[45] Feb. 14, 1984

[54] CURRENT AMPLIFYING APPARATUS

[75] Inventor: Oved S. F. Zucker, Del Mar, Calif.

[73] Assignee: FDX Patents Holding Company, N.V., La Jolla, Calif.

[21] Appl. No.: 319,065

[22] Filed: Nov. 6, 1981

[51] Int. Cl.³ .......... G05B 24/02

[52] U.S. Cl. .......... 323/340

[58] Field of Search .......... 323/340, 342, 343, 355, 323/358, 359, 360

[56] References Cited

U.S. PATENT DOCUMENTS

| | | | |
|---|---|---|---|
| 1,808,559 | 6/1931 | Kubler et al. | 323/340 |
| 2,186,211 | 1/1940 | Schwaiger | 323/340 |
| 2,498,236 | 2/1950 | Barclay, Jr. | 323/340 |
| 2,983,889 | 5/1961 | Green | 338/32 |
| 3,015,057 | 12/1961 | Alverson | 323/340 |
| 3,150,291 | 9/1964 | Laquer | 317/123 |
| 3,258,727 | 6/1966 | Weinschiemer et al. | 336/192 |
| 3,271,716 | 9/1966 | Furth | 336/181 |
| 3,277,322 | 10/1966 | Berlincourt | 310/40 |
| 3,433,970 | 3/1969 | Baldwin | 307/11 |
| 3,445,753 | 5/1969 | Maxwell | 323/342 |
| 3,585,403 | 6/1971 | Gribbons | 307/252 |
| 3,626,271 | 12/1971 | Dewey | 321/11 |
| 3,651,374 | 3/1972 | Faust | 317/11 A |
| 3,772,532 | 11/1973 | Petrov et al. | 306/252 L |
| 3,887,889 | 6/1975 | Kartov et al. | 336/146 |
| 4,242,594 | 12/1980 | Jensen | 307/98 |

OTHER PUBLICATIONS

9th Symposium on Engineering Problems of Fusion Research IEEE Pub. No. 81CH1715-2 NPS-Oct. 26-29, 1981.

S. L. Wipf; Reversible Energy Transfer between Inductances.

Antoni, et al.; The Commutation of the Energy Produced by a Helical Explosive Generator Using Exploding Foils.

Peterson, et al., Superconductor Industor-Converter Units for Pulsed Power Loads.

Superconductivity, Energy Storage and Switching; H. L. Laquer.

Inductive Energy Transfer Using a Flying Capacitor; E. P. Dick, et al.

*Primary Examiner*—William M. Shoop

*Attorney, Agent, or Firm*—Schwartz, Jeffery, Schwaab, Mack, Blumenthal & Koch

[57] ABSTRACT

Disclosed is a reversible inductive energy transfer device for use where efficient transfer of energy between inductors is required. The apparatus is a current amplifying device which utilizes an induction coil comprising a plurality of series connected induction elements, the induction coil being connected in series with a current source and a load. The series connected induction elements are progressively connected in series with the induction coil across the load beginning at the end of the induction coil electrically distal from the load and ending at the end of the induction coil electrically nearest the load. Adjacent induction elements are progressively connected to the load in a make-before-break manner. The connection may be made either by a sliding contact which makes electrical contact with electrical taps located along the induction coil by means of superconducting switches or semiconductor switches. The storage inductor may also be superconducting.

36 Claims, 29 Drawing Figures

CURRENT AMPLIFYING APPARATUS

BACKGROUND OF THE INVENTION

1. Field of the Invention

This invention relates generally to a device for the adiabatic energy transfer from an inductive store to an inductive and/or resistive load with or without power amplification.

The invention also provides a method and means for current and power multiplication for electromagnetic guns, high power pulse generators, and inertial fusion. More particularly, this invention relates to a reversible magnetic energy source for energizing the magnetic field coils of a fusion reactor.

2. Background of the Invention

The need for supplying large reversible inductive energy to fusion machines has prompted extensive work. The problem with direct transfer of inductive energy is two-fold: (1) it is theoretically limited to 25% with 50% efficiency, (2) the transfer process is obtained by opening a switch which invariably generates large transient voltages which makes the switching operation very difficult. Prior art related to magnetic fusion applications for energy transfer between inductors concentrated mainly on transferring the energy via a capacitive or inertial (flywheel) "bucket" of variable size. Typically a "bucket" containing 5% of the total energy to be transferred has to be "carried" between the two reservoirs 20 times. (Such systems must still have all the opening switches needed to effect transfer.) In tokamaks inductive energies are in the GJ range and consequently the "bucket" size is in the tens of MJ. The cost of such large capacitive or inertial systems is high.

Conventional prior art related to high power multiplication for pulsed power applications such as high power pulse generators for inertial fusion, radiation sources, electromagnetic guns, and the like involve the resonant energy transfer between inductors and conventional or inertial capacitors. Such transfer is efficient, but it has problems. The inertial capacitor is compact but slow in contrast to the conventional capacitor which is fast but large. Prior art related to power multiplication utilizing inductors only are of two types: (1) A number of inductors are energized in series and reconnected to discharge in parallel. Here all the opening switches affecting the series to parallel conversions also see the extremely destructive high voltage when the resulting parallel arrangement is open circuited to energize the load; a fact that makes this circuit impractical. (2) In the second type, successive transfer of energy between inductors with the attendant inefficiency is affected by opening a switch with or without the aid of a transformer which is used for both impedance transformation and/or decoupling.

SUMMARY OF THE INVENTION

It is, therefore, an object of the present invention to provide a purely inductive high efficiency means for transferring energy between inductors, with substantially reduced voltage transients.

It is a further object of the present invention to provide a current amplifying device in which low voltage, low current energies are multiplied into a high current, high voltage energy pulse in the tera-watt power range. Additionally, for the purpose of inertial fusion applications and the like, an embodiment is shown where the load inductor is magnetically decoupled but physically concurrent with the storage inductor facilitating current and power multiplication in small volumes.

It is still a further object of the present invention to provide a pulsed current amplifying apparatus utilizing an induction energy storage device.

It is yet another object of the present invention to provide a pulsed current amplifying apparatus in which the high energy pulse of current is achieved through mechanical extraction of the energy from an inductance.

It is still a further object of the present invention to provide a high energy current amplifying apparatus in which the high energy pulse of current is achieved through electronic extraction of the energy from the inductance.

It is a still further object of the invention to provide a reversible inductive energy transfer device for energizing the field coils of magnetic confinement fusion reactions.

It is a still further object of the invention to provide a method and apparatus for reversibly transferring energy between inductors where efficency is required.

The apparatus of the present invention avoids many of the prior art problems. The apparatus of the present invention comprises, basically, an induction coil comprising a plurality of series connected induction elements, the induction coil having a first end and a second end with the first end connected to one side of a current source. The apparatus further comprises a load inductor having a first side and a second side, the second side of the load being connected to the first side of the current source and the second side of the load inductor being connected to the second end of the induction coil. The first end of the induction coil is connected to the first side of the current source energy which is disengaged after energization of the induction coil. In addition, the apparatus comprises a device for progressively connecting one of the induction elements to the load inductor, then connecting an immediately adjacent induction element to the induction element already connected to the load inductor, followed by disconnecting the first induction element from the load inductor leaving the second induction element connected to the load inductor.

The process for amplifying current of the present invention comprises, basically, the steps of causing an electrical current to flow in a series connected load inductor and induction coil, the induction coil comprising a plurality of series connected induction elements, and then progressively electrically connecting the individual induction elements of the induction coil to the side of the load inductor electrically distal the induction coil beginning at the end of the induction coil electrically distal the load inductor. Alternatively, the induction elements can be connected all at once but disconnected sequentially as before.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE PREFERRED EMBODIMENTS

The approach of the present invention is to transfer energy from one inductor to a second inductor by changing the number of turns of either the inductors or the turn ratio of a transformer connecting the two inductors in many small steps. In the limit, the change in tne number of turns is sufficiently smooth to effect a theoretically 100% efficient transfer.

Figure 1A:
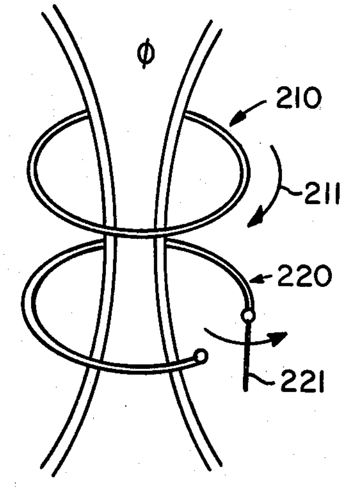
FIG. 1A is a perspective of an illustration describing the principals of the invention.

FIG. 1 explains this principal. In FIG. 1A. Turn 220 and turn 210 are mutually coupled loops with perfect coupling surrounding a constant magnetic flux each carrying the same current value. If switch 221 of turn 220 is opened, the current flowing in turn 210 will be doubled.

In equation form this can be represented by the following equation $$NI = \frac{\phi}{\mu(A/l)}, \tag{1}$$

where

A is the cross-sectional area enclosed by the coil winding, l is the mean flux length, N is the number of coil turns, and $\phi$ is the magnetic flux.

Figure 1B:
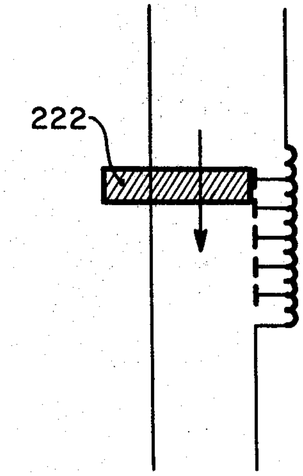
FIGS. 1B and 1C are schematic circuit diagrams of multiturn arrangements in accordance with the principals of the invention.
Figure 1C:
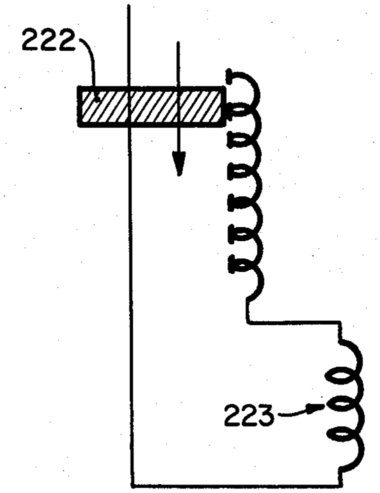

As long as the magnetic field geometry in space is constant, the ampere turns NI will remain constant, and reducing the number of turns increases the current. FIG. 1B shows such a multiturn arrangement where the change in the number of turns is affected by a sliding contact 222 as in a potentiometer in a manner to be described in detail below. Here we see that as the incremental change in the number of turns approaches zero, N decreases monotonically, while I increases monotonically according to the equation $$I = k/N, \tag{2}$$

where $k=\phi(NA/l)$. With the presence of a load inductor 223 (FIG. 1C), the above-mentioned monotonic current rise affects an energy transfer into this load. Now, however, the current rise obeys the equation $$I = \frac{const}{(N^2 + \alpha)^{\frac{1}{2}}} \tag{3}$$

where $\alpha$ is the ratio of the load inductance to the geometrical source inductance NA/l.

From the above we see that this process is reversible in the sense that increasing the number of turns will reverse the direction of energy flow.

The above description refers to an idealized perfect coupling configuration. Although in practice this condition cannot be achieved, real embodiments do come sufficiently close to validate the description. The voltage generated at the load equals the load inductance times the rate of change of the current which can be kept quite low by a monotonic change in L affected by the use of many turns and taps. The voltage at the sliding contact has two components. The first is a fraction of the load voltage determined by the ratio of the number of turns or fraction of a turn per turn element to the remaining turns. This is generally a very small number. The second component is due to imperfect coupling and equal to the rate of destruction of leakage flux, that is, flux associated only with the turn element which is presently switched out. This component is also low and is controlled by the suitable tap or contact resistance.

Figure 2:
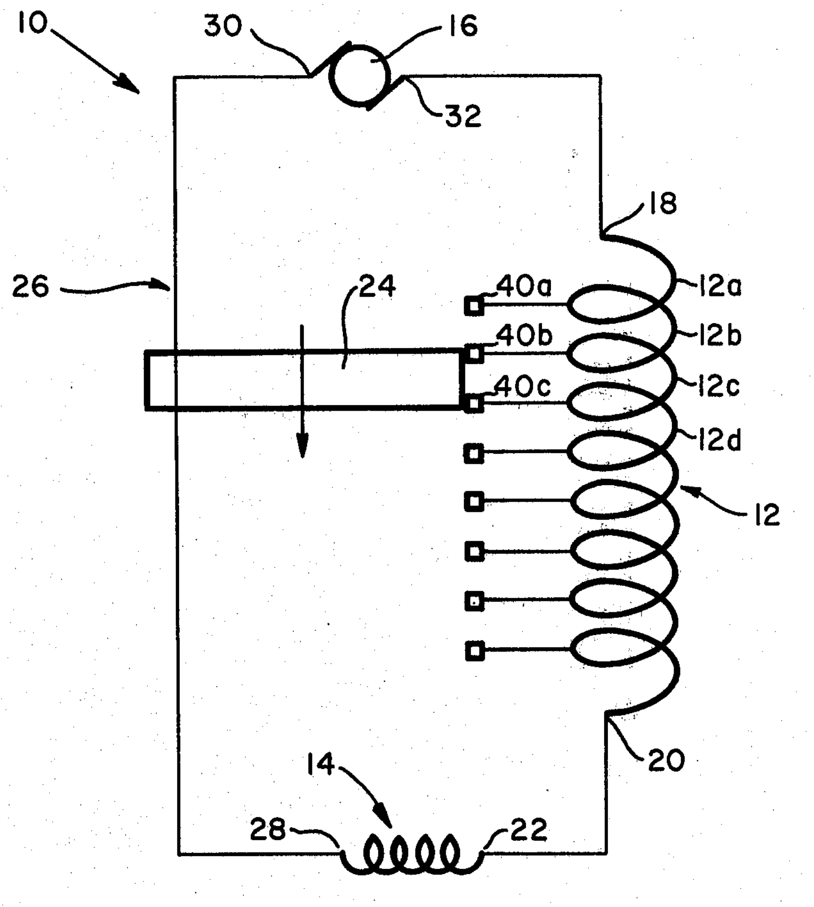
FIG. 2 is a schematic circuit diagram showing the mechanical configuration of the current amplifying apparatus of the present invention.

The turn wiping action affected by the slide contact is shown in detail in the embodiment of FIG. 2.

With reference to FIG. 2, there is illustrated a schematic diagram of the basic configuration of the current amplifying apparatus 10 of the present invention.

Current amplifier 10 comprises, basically, an induction coil 12 connected in series to a load inductor 14 and a current source 16 to be disconnected after energizing the coil 12.

In FIG. 2, although load 14 is shown as a pure inductance, other loads comprising pure resistance, or capacitance, or combinations thereof, can be used.

Induction coil 12 comprises a plurality of series connected induction elements 12*a*, 12*b*, 12*c*, etc., beginning at first end of induction coil 12 electrically distal from the load inductor 14 and ending at second end 20 of induction coil 12 electrically nearest first side 22 of load inductor 14. A shorting bar 24 is adapted to electrically connect individual induction elements 12*a*, 12*b*, 12*c*, etc., to conductor 26 which electrically connects second side 28 of load inductor 14 to second side 30 of current source 16. First end 18 of induction coil 12 is, as shown, connected to first side 32 of current source 16.

With reference to FIGS. 3A through 3F, inclusive, there are illustrated several turns of induction coil 12 and various stages of the progressive wiping action by shorting bar 24 as it travels from first end 18 to second end 20 of induction coil 12.

Figure 3A:
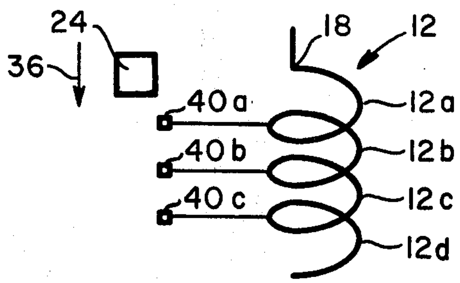
FIGS. 3A, 3B, 3C, 3D, 3E and 3F are schematic electrical diagrams illustrating the turn-wiping action of the apparatus shown in FIG. 2.

With particular reference to FIG. 3A, shorting bar 24 is shown immediately prior to beginning the wiping action. Shorting bar 24 will begin travel in the downward direction shown by arrow 36.

Figure 3B:
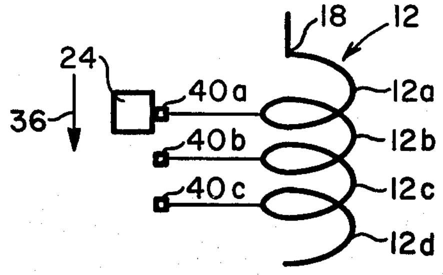
Figure 3C:
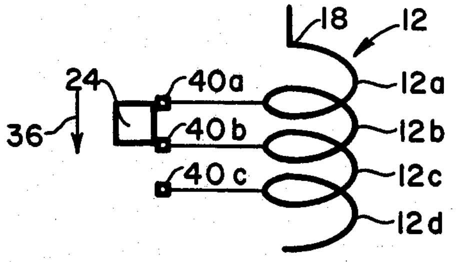

With reference to FIG. 3B, shorting bar 24 is shown making contact with terminal or electrical contact 40a of individual coil or induction element 12a. As shorting bar 24 continues in the direction of arrow 36, and as shown in FIG. 3C, it next contacts electrical connector or terminal 40b which connects individual coil or induction element 12b to second side 20 of load inductor 14, and also to immediately adjacent individual coil or induction element 12a since the width of shorting bar 24 is adapted to bridge or make contact with both terminals 40a and 40b simultaneously.

Figure 3D:
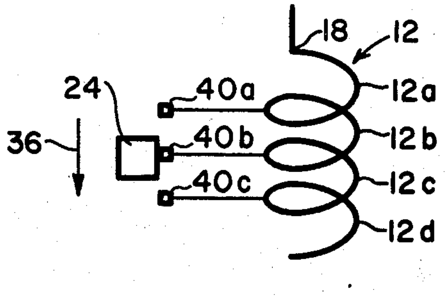

As shorting bar 24 continues its travel in the direction of arrow 36, in FIG. 3D, shorting bar 24 is shown in sole contact with terminal 40b of individual coil or induction element 12b and disconnected from terminal 40a of individual coil or induction element 12a.

Figure 3E:
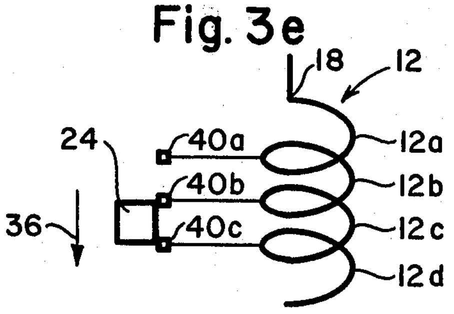

With reference to FIG. 3E, as shorting bar continues its travel in the direction indicated by arrow 36, it comes in contact with terminal 40c of individual coil or induction element 12c, while concurrently being in contact with terminal 40b of individual coil or induction element 12b as well as second side 20 of load inductor 14.

Figure 3F:
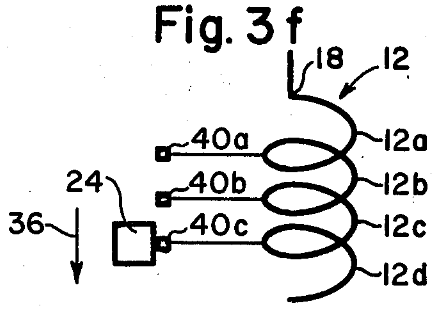

Still continuing in the direction indicated by arrow 36, as shown in FIG. 3F, shorting bar 24 comes in sole contact with terminal 40c of individual coil or induction element 12c and becomes disconnected from terminal 40b of individual coil or induction element 40b.

Thus the wiping action is performed in the manner of a make-before-break switch which alternately connects a single induction element to second side 28 of load inductor 14 and then shorts out adjacent induction elements while still being connected to second side 28, followed by connecting the single adjacent induction element to second end 24 of load inductor 14 as shorting bar 28 travels along induction coil 12 toward load inductor 14. Therefore, as the number of turns is reduced, as by the wiping action of shorting bar 24 traveling from first end 18 to second end 20 of induction coil 12, the current is increased such that the last turn of coil 12 will carry a current equal to the number of turns of coil 12 times the initial current through the coil.

Basically, the process for amplifying a current utilizing, for example, current amplifying apparatus 10 comprises the steps of causing an electrical current to flow in a series connected load inductor 14 and induction coil 12, the induction coil 12 comprising a plurality of series connected induction elements 12a, 12b, 12c, etc., and then progressively electrically connecting the individual induction elements 12a, 12b, 12c, etc., to second side 28 of load inductor 14 which is electrically distal from the induction coil 12 beginning at first end 18 of induction coil 12 electrically distal from the load inductor 14 and ending at second end 20 of induction coil 12 electrically nearest load inductor 14. It will be appreciated by the artisan that the method described above is exemplary and is used for illustrative purposes and as explained below, does not limit the invention to the specific steps thereof.

Figure 4:
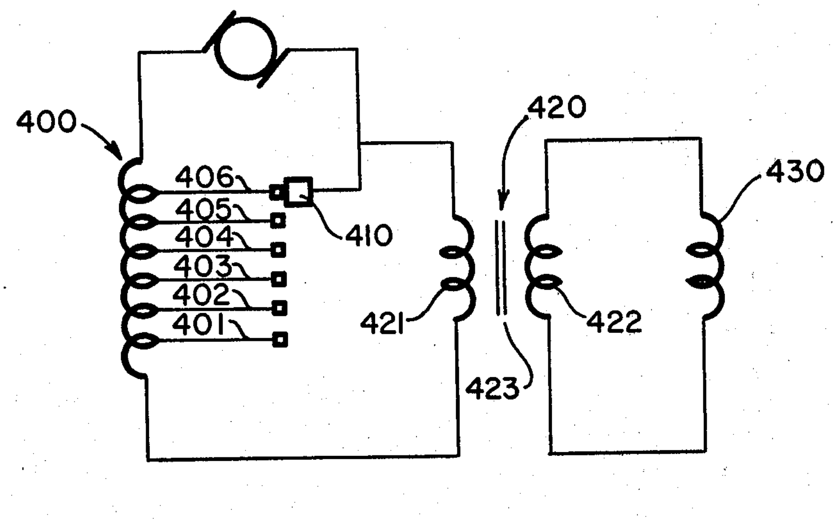
FIG. 4 is a schematic circuit diagram showing another configuration of the current amplifying apparatus of the present invention.
Figure 5:
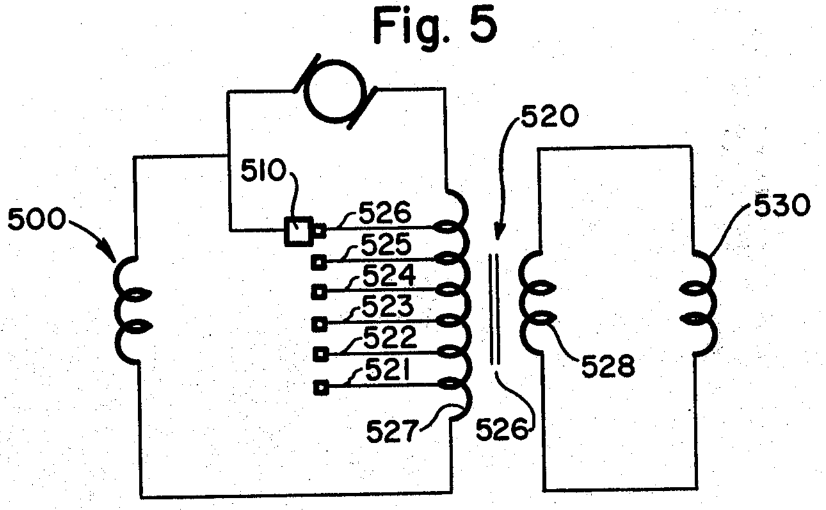
FIG. 5 is a schematic circuit diagram showing another configuration of the current amplifying apparatus of the present invention.

FIGS. 4 and 5 represent two additional embodiments of the invention. In FIG. 4, 400 represents the storage inductor and 401–406 represent the taps along the storage inductor 400. Switch 410 represents a sliding contact similar to switch 24 in FIG. 2. Transformer 420, which couples the current to the load inductor 430, consists of primary winding 421, secondary winding 422 and core 423.

In FIG. 5, the storage inductor 500 is uptapped. The taps 521–526 are loaded on the primary winding 527 of the transformer 520, which also has a secondary winding 528 and a core 529. The load inductor 530 is placed across the transformer secondary 528, and a sliding contact 510 is positioned along the taps.

The operation of the circuit of FIGS. 4 and 5 is similar to that of FIG. 2. The storage inductors, 400 and 500, and transformer 520, respectively, are composed of closely coupled turns. In FIG. 4 the turns have taps connected to them, in FIG. 5 the taps are connected to the transformer primary 520. Sliding the contact 410 or 510, respectively, along the taps has the effect of changing the number of turns of the storage inductor 400 or the primary winding 520.

Figure 6A:
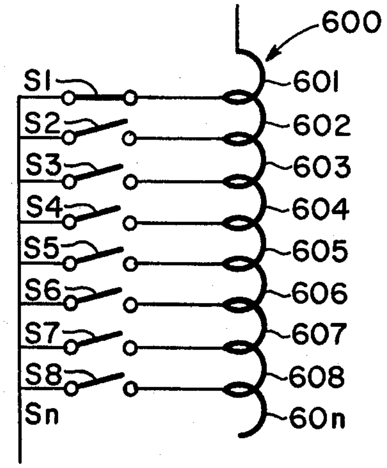
FIGS. 6A, 6B and 6C, are schematic electrical diagrams illustrating the switching action of the apparatus of FIGS. 2, 4 or 5.
Figure 6B:
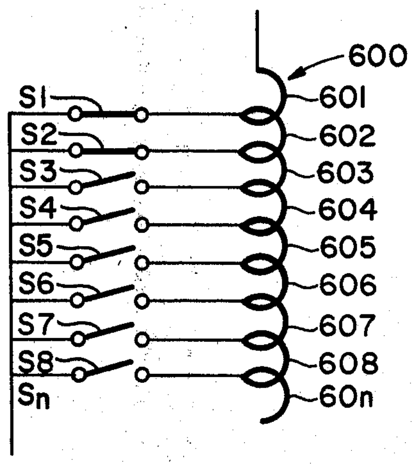
Figure 6C:
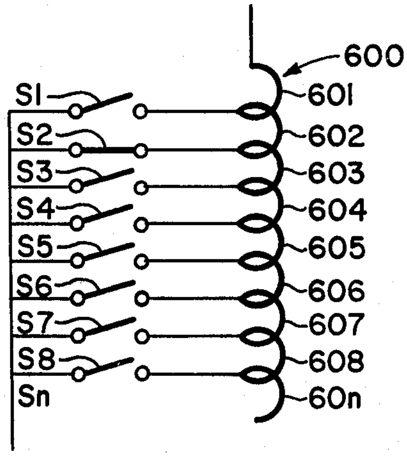

The changing of tap positions in the circuits of FIGS. 2, 4 or 5 effectively constitutes switching. The sliding contacts in FIGS. 2, 4 or 5, i.e., members 24, 410 and 510, respectively, may therefore alternatively be in the form of switches that open and close as shown in FIGS. 6A-C. The voltages seen by the switches $S_1, S_2, \ldots S_n$ in FIG. 6 is kept below the load voltage, i.e. the voltage across 14 in FIG. 2 or 430 in FIG. 4 or 530 in FIG. 6 since the switch voltage is always transformed down by the turn ratio between the turns to be opened and the remaining turns in the storage inductor (or primary winding of FIG. 5). For tokamaks the voltage is in the 1000 V region. Thus the switch voltage is kept at the reasonably low value of on the order of about 300 V. Thus, in the case of the direct-coupled embodiment of FIG. 2 which requires high voltage, high current switches, it is best to use superconducting switches. In the transformer coupled embodiment of FIGS. 4 and 5 the source current is different from the load currents. Therefore, different switch impedances are used according to the tokamak coil to be energized.

As can be readily seen from FIGS. 6A–6C, the switch embodiment of the present invention utilizes the same make-before-break contact mode as did the tap embodiment. Thus, in FIG. 6 when switch S1 is closed, shorting out winding 601 of inductor 600 all the remaining switches are open. Switch S2 then closes while S1 is still closed. Not until S2 is closed does S1 reopen. The sequence of operation is repeated for the remaining switch associated with the inductor 600.

It will be understood that the switch sequenching can be done mechanically, electromechanically or electronically and in that regard the switch may be either of the mechanical, electromechanical or semiconductor variety or exploding wire variety. It should also be readily seen that switch sequencing can also be performed by first closing all the switches in FIG. 6 and then opening them sequentially.

Figure 7:
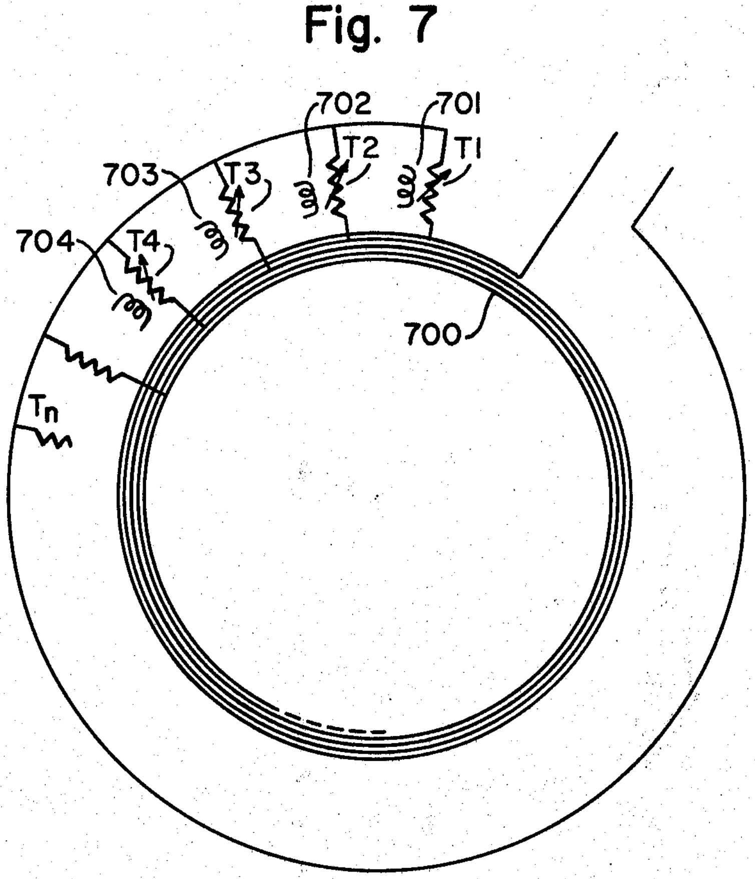
FIG. 7 is a schematic circuit diagram showing another configuration of the current amplifying apparatus of the present invention.

A superconducting storage and switching embodiment is depicted in FIG. 7. Here concentric taps $T_1$–$T_n$ are positioned in an arrangement about a circular inductor 700. The taps are represented in FIG. 7 by variable resistors which may be superconducting or electromechanical switches. It will be understood that they can be field or heat activated by coil elements, e.g. 701 and 702, which can be heating coils or EM coils. The operation of these coils forms no part of the instant invention but can be accomplished according to the teaching of H. L. Laquer in the article entitled *Superconductivity, Energy Storage and Switching,* p. 279 et seq in Energy Storage, Compression and Switching (Plenum Press, New York, 1976).

Likewise, the switches, e.g. $T_1$, $T_2$ can be superconducting. The switching of the switches forms no part of the instant invention but can be accomplished according to the teachings of Peterson et al in their article entitled *Superconductive Inductor-Convertor Units for Pulsed Power Loads* appearing at p. 309 et seq of Energy Storage, Compression and Switching, Plenum Press, New York, 1976).

Figure 8A:
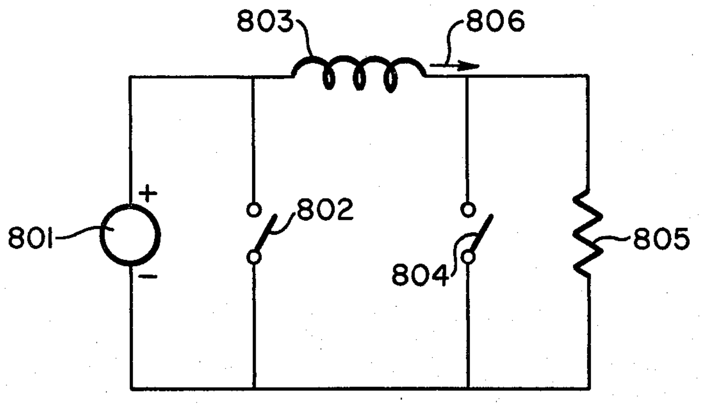
FIG. 8A is a schematic circuit diagram of a very high power embodiment of the invention.

For the purpose of multiplying power in the terra watt regime an inductor carrying millions of amperes is shunted by an opening switch such as an exploding wire array as described below, a reflex switch, or an exploding plasma such as a dense plasma focus. Typically, these serve as both load and switch as shown in FIG. 8A. With switch 802 of FIG. 8*a* open and switch 804 closed, energy source 801 will energize inductor 803, building up a current in the inductor whereupon switch 802 is closed. When switch 804 opens, the energy stored in inductor 803 is delivered to the load at great power.

Typically the current 806 is in the MA range and opening switch 804 can carry this current for short times only. This necessitates energy source 801 to build up the current in inductor 803 very rapidly. To date only capacitive storage was sufficiently fast for these applications.

Figure 8B:
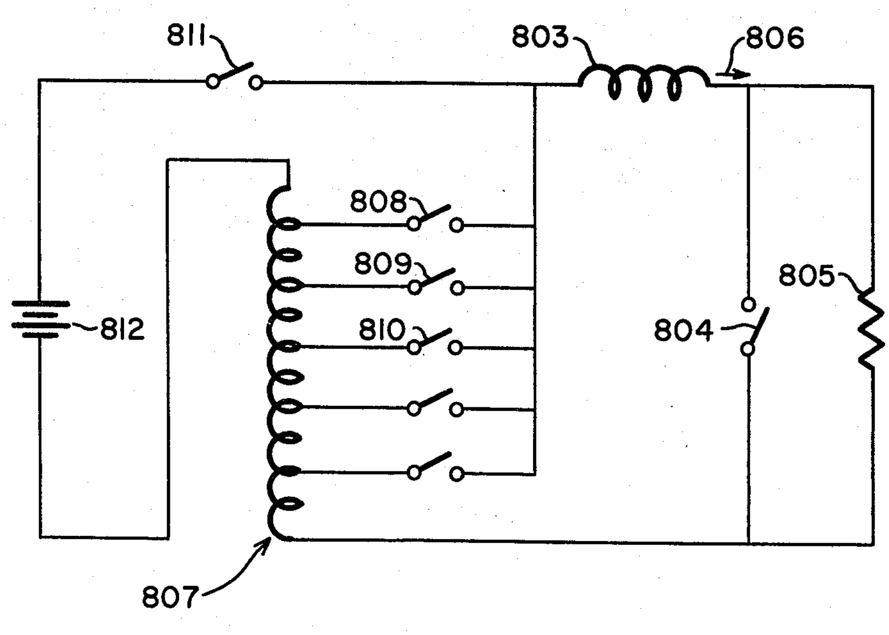
FIG. 8B is a schematic circuit diagram of a further embodiment of the invention.

An embodiment of the present invention where inductor 803 is energized by the switching actions of FIGS. 2, 3, and 6 is shown schematically in FIG. 8B. Here a primary energy source 812 energizes storage inductor 807 via switch 811. Due to the fact that inductor 807 is chosen to be much greater than inductor 803, the current during this phase is very small and does not affect switch 804 adversely. Also, under these conditions most of the energy transferred from source 812 resides in storage inductor 807.

For the energy transfer from storage inductor 807 to inductor 803, switch 808 is closed while switch 811 is opened to first isolate source 812. Thus, in a manner similar to the method described previously, switch 809 is closed followed by opening switch 808. Switch 810 is the closed followed by opening switch 809 and so forth until all the switches in storage inductor 807 have been opened. As before the current multiplier transfers the energy to load inductor 803 by opening switch 804 when current 806 has reached a maximum to energize load 805 at very high power.

Figure 9A:
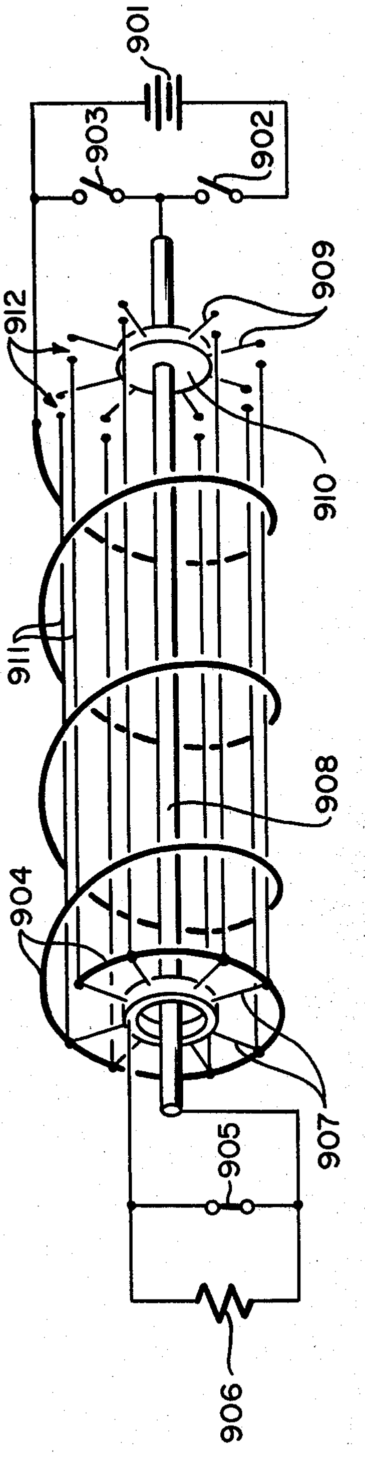
FIGS. 9A–9F illustrate a further embodiment of the apparatus of the present invention utilizing a helical induction coil and squirrel cage configuration and the operation thereof.
Figure 9B:
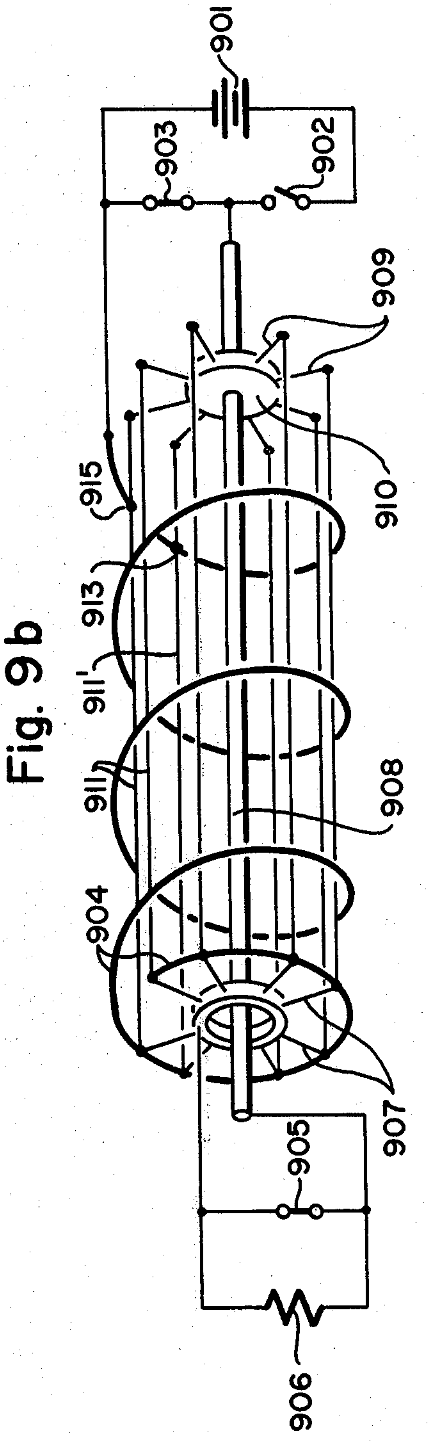

An embodiment of this circuit, where inductor 803 is spatially concurrent with storage inductor 807 while magnetically decoupled is shown in FIG. 9A.

Here storage inductor 807 of FIG. 8B is represented by the helix winding 904. It produces a magnetic field axial with respect to the helix. Inductor 803 of FIG. 8B is equivalent to center rod 908 and circumferential rods 911, which produce a magnetic field circumferential to the central rod 908. Thus while the inductors 904 and 908 are concurrent in space, they are magnetically distinct.

The circuit operates as follows. Initially (FIG. 9A) the energy is entirely in primary source 901 and all currents are zero. When switch 902 is closed, a current builds up in storage inductor 904 by flowing through rod 908, load switch 905, spokes 907, and helix 904, back to source 901. Upon completion of energy transfer to the storage inductor 904, a relatively low current flows in the circuit. The source 901 is then isolated by closing switch 903 and opening switch 902. The spokes 909 are then shorted to rods 911 through shorting gaps 912 to provide a coaxial current path through the rods 911 as explained in detail below.

Figure 9C:
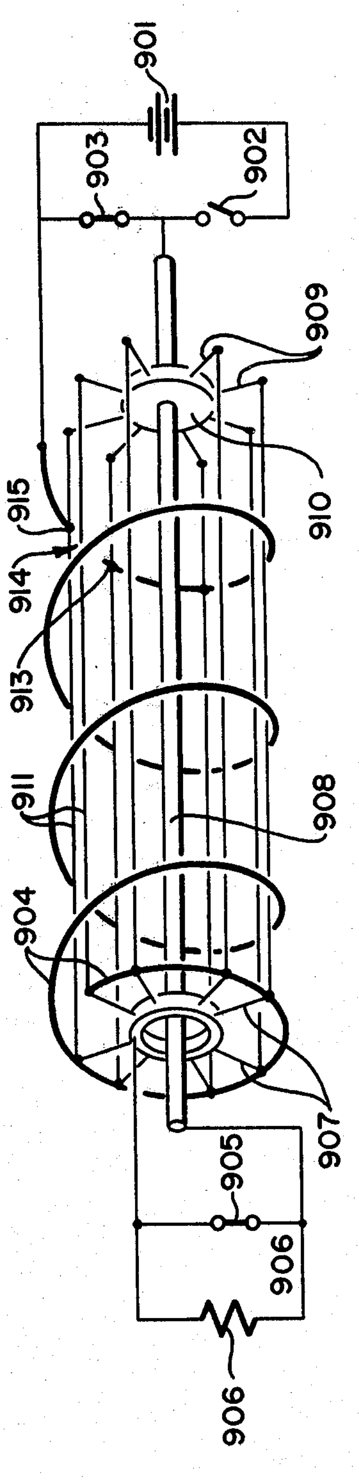
Figure 9D:
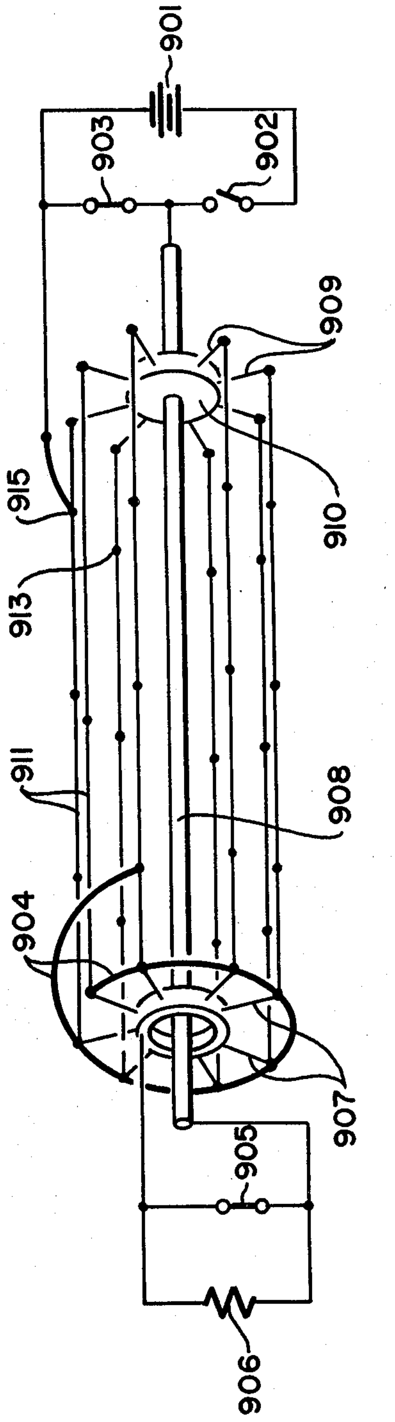
Figure 9E:
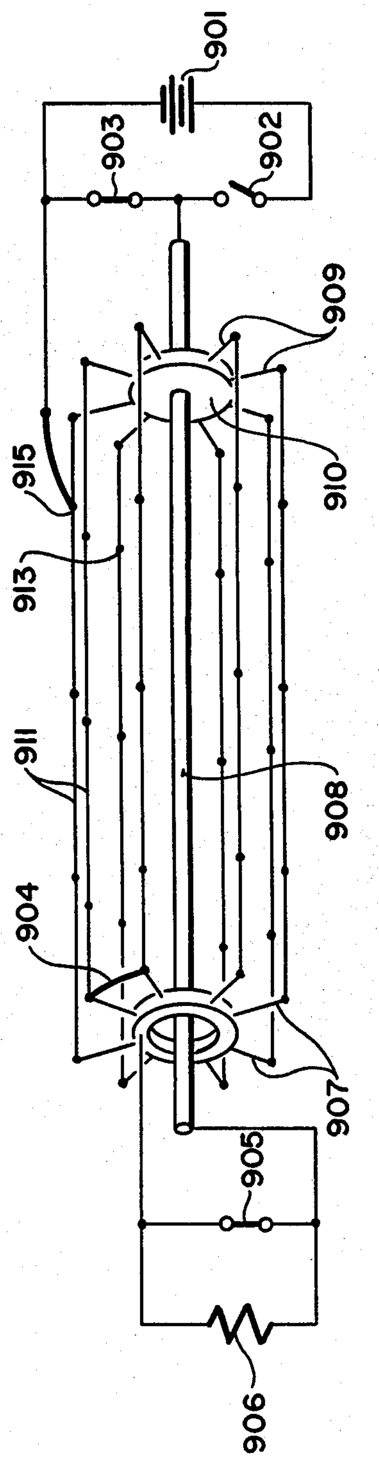

The switching action of switches 808, 809 . . . in FIG. 8B is analagous to the "switching" of the helix 904 of FIG. 9A. The switching action of FIG. 9A is best understood by reference to FIGS. 9B through 9E and is affected by shorting the beginning of the helix 904 to a rod 911 at a point 915. The helix 904 is then shorted to the following rod 911 at point 913 followed by open circuiting the helix 904 at point 914 (FIG. 9C) between points 915 and 913. This process is sequentially and repeatedly followed in the same manner as described above as the helix 904 is alternatively shorted to members 911 and open circuited at the point electrically nearest to the source from the point on the helix that was shorted to the member 911. This process continues in a manner analogous to that described in reference to FIGS. 2, 3A–3F, and 6A–6C until all the helix is gone (or disconnected into small pieces) as illustrated in FIGS. 9D and 9E. The above-described switching action roughly multiples the current by the number of turns in the helix, which practically would be between 10 and 100 times but as will be understood by the artisan could in theory be any number of turns, depending only upon the current multiplication desired and the physical constants of the materials involved.

Figure 9F:
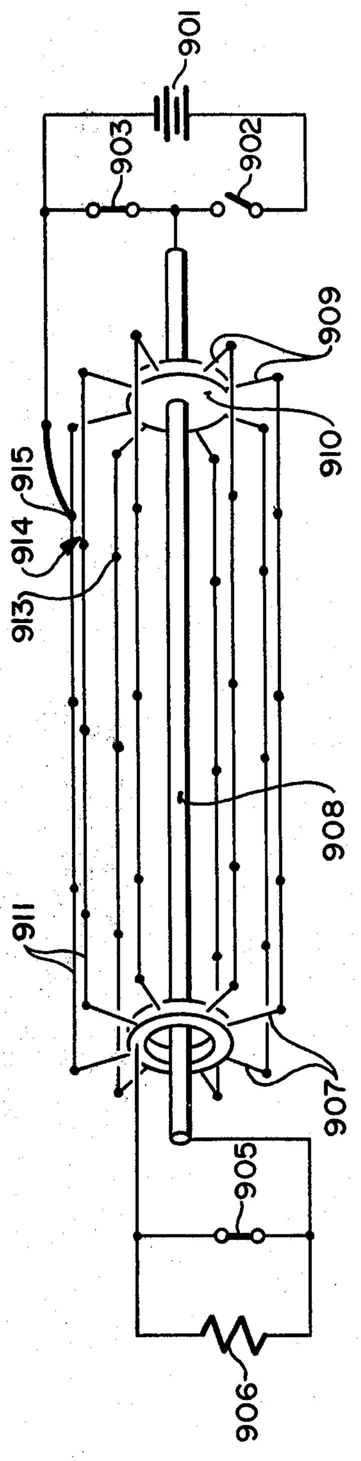

The resulting configuration (FIG. 9F) has all the current flowing axially in the center rod 908 and the circumferential rods 911. This is a very favorable configuration for discharging this inductor into load 906 by opening switch 905. It should be noted that upon such a discharge, the high electric field generated is all radial between the central rod 908 and circumferential rods 911. The switching action described above has all been at the outer circumference of the device and the subsequent loss of the helix 904 will not interfere with the transfer of energy to load 906.

The switching sequence to effect the energy transfer from the helix configuration to the coaxial configuration can be very fast. The shorting action 915, 913, 914, etc. can be accomplished using electrically or optically triggered semiconductors or can operate by insulation breakdown with exploding wires. The opening "switch" action 914 at helix 904 can be either a superconductor as in FIG. 7 or the helix can be configured as an exploding wire where the successive increase in current causes the next section of helix to blow in a manner similar to a fuse and thus act as an open circuit. The art of opening a circuit by the use of blowing and non-blowing fuses is well known and does not per se form any part of the present invention.

Figure 10B:
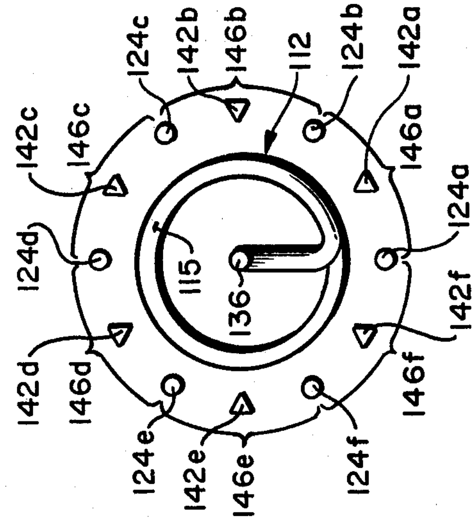
FIG. 10B is an end view of the apparatus of FIG. 10A.
Figure 10A:
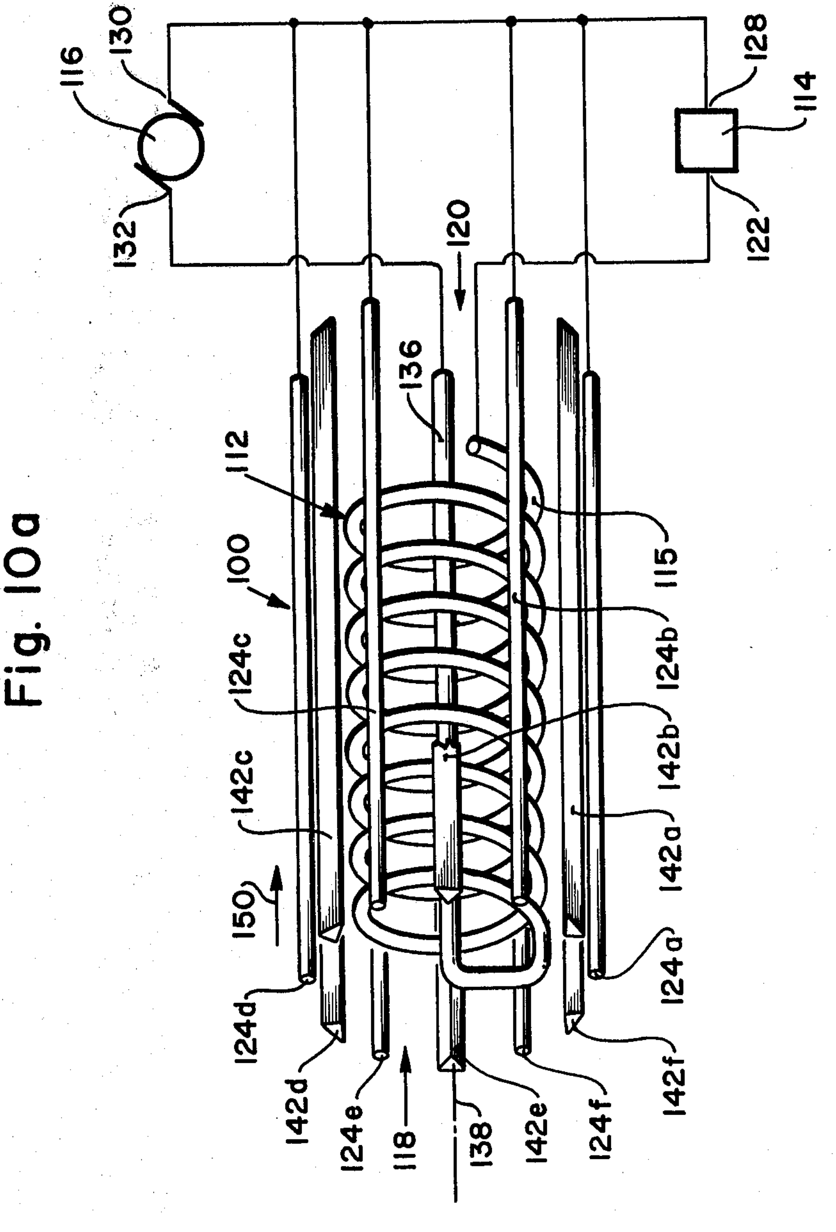
FIG. 10A illustrates a further embodiment of the helical induction coil apparatus of the present invention.

For slower energy transfer rates, i.e., between 100 μsec and 10 msec, the invention can alternatively utilize the propagating detonation of a fuse as illustrated in FIGS. 10A and 10B.

With reference to FIG. 10A, there is illustrated a squirrel cage current amplifying apparatus 100 in accordance with one embodiment of the present invention comprising, basically, a helically wound coil conductor 115 defining an induction coil 112 which is connected, at its first end 118, to a second side 132 of current source 116 and whose second end 120 is connected to a first side 122 of load 114. Second side 128 of load 114 is, in turn, connected to second side 130 of current source 116.

A plurality of shorting bars 124*a* through 124*f*, inclusive, are equally spaced circumferentially about induction coil 112 to define a squirrel cage configuration. Coaxially through the center of induction coil 112 is first conductor 136 which connects first end 118 of induction coil 112 to first side 132 of current source 116.

It will be noted that first conductor 136 is coincident with longitudinal axis of rotation 138 of induction coil 112. It is also apparent that shorting bars 124*a* through 124*f*, inclusive, are parallel to longitudinal axis 138.

Also surrounding induction coil 112 and spaced equidistant between shorting bars 124*a* through 124*f*, inclusive, are conductor shear bars 142*a* through 142*f*, inclusive.

In addition, shorting bars 124*a* through 124*f* are also electrically connected to second side 128 of load 114 and second side 130 of current source 116. The electrical connection is made adjacent second end 120 of induction coil 112.

With particular reference to FIG. 10B, there is illustrated an end view of squirrel cage current amplifying apparatus 100 of FIG. 10A taken at lines 9—9. In FIG. 10A, it can be seen that, from this end view, shorting bars 124*a* through 124*f* are shown equally spaced circumferentially around induction coil 112.

It should be noted that along helically wound coil conductor 115, between each shorting bar, is defined an individual induction element. That is, instead of an induction element being defined as a single loop of the induction coil, as in current amplifying apparatus 10 of FIG. 1, an induction element of squirrel cage current amplifier 100 is defined as a portion of a loop of induction coil 112.

For example, the induction element identified as induction element 146*a* is that portion of the coil conductor 115 loop disposed between shorting bars 124*a* and 124*b*. Induction element 146*b* is defined by that portion of the coil between shorting bars 124*b* and 124*c*. Induction element 146*c* is defined by that portion of the coil between shorting bars 124*c* and 124*d*. Induction 146*d* is defined by that portion of the coil between shorting bars 124*d* and 124*e*. Induction element 146*d* is defined by that portion of the coil between shorting bars 124*d* and 124*e*. Induction element 146*e* is defined by that portion of the coil between shorting bars 124*e* and 124*f*. Induction element 146*f* is defined by that portion of the coil between shorting bars 124*f* and 124*a*.

Figure 11A:
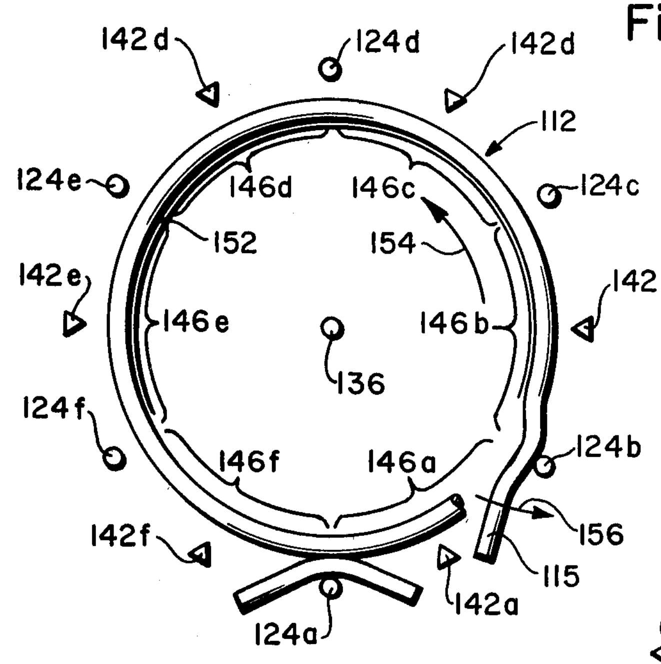
FIGS. 11A, 11B and 11C are cross-sectional views of the apparatus of FIG. 10A taken at line 10—10 showing progressive stages of wiping, smearing or connecting adjacent induction elements to the load inductor.
Figure 11B:
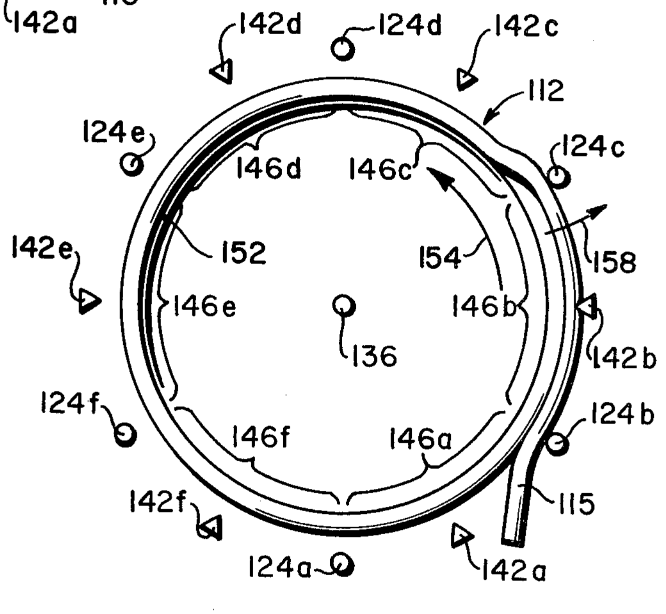
Figure 11C:
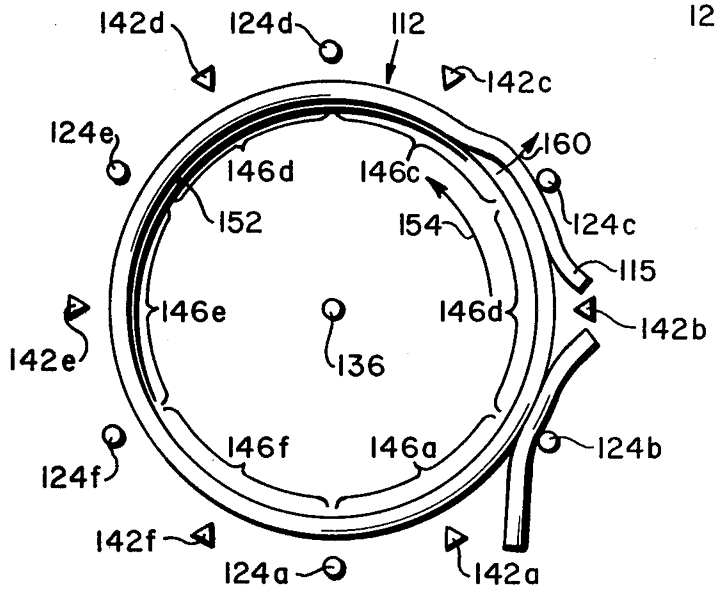

The operation of squirrel cage current amplifying apparatus 100 is best illustrated in FIGS. 11A, 11B and 11C which are cross-sectional views taken of squirrel cage current amplifying apparatus 100.

As shown in FIG. 11A, the combustion shock wave of detonating fuse 152 is shown propagated just beyond shorting bar 124*b* whereby the force of the shock wave has forced conductor 115 outwardly, as shown by arrow 156, to make electrical contact with shorting bar 124*b*.

In FIG. 11B, the combustion shock wave of detonating fuse 152 is now shown propagated to a point just beyond shorting bar 124*c* continuing to force coil conductor 115 outwardly, as indicated by arrow 158, to make electrical contact with immediately adjacent shorting bar 124*c*, while at the same time maintaining contact with shorting bar 124*b*. It will also be noted that coil conductor 115 is also initially making mechanical contact with conductor shearing bar 142*b*. Thus, induction element 146*b* is now effectively shorted out.

With reference to FIG. 11C, the combustion shock wave of detonating fuse 152 has not propagated to a point approaching shear bar 142*c* while still remaining in electrical contact with shorting bar 124*c*. At this point, it will be noted that coil conductor 115 has now been completely severed by shear bar 142*b*. Thus, induction element 146*b* is now disconnected from the circuit. This leaves shorting bar 124*c* connected to coil conductor 115.

In a like manner, the combustion shock wave of detonating fuse 152 will continue in the direction shown by arrow 160 to a position causing coil conductor 115 to make electrical contact with shorting bar 124*d* while concurrently maintaining electrical contact with shorting bar 124*c*, after which shear bar 142*c* will sever coil conductor 115 effectively disconnecting induction element 146*c* from the circuit.

Thus, in a manner similar to that described for current amplifying apparatus 10 of FIGS. 2 and 3E through 3F, a first induction element of the induction coil is connected to the load followed by connecting first and second immediately adjacent induction elements to each other as well as to the load, followed by disconnecting the first induction element from the load, leaving the second induction element electrically connected to the load.

With respect to FIG. 10A and the squirrel cage amplifying apparatus 100, the current passing initially through conductor 115 of inductor coil 12 will generate a large magnetic field component and a small electric field component due to the central return through first conductor 136. As previously described, removing turns, as illustrated in FIGS. 3A through 3F, inclusive, and FIGS. 6A through 6C, inclusive, will increase the current which will increase the circumferential magnetic field at the expense of the axial magnetic field. When all turns are removed, there is left only a coaxial inductor which can then be dumped into, that is, connected to, the load.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as suited to the particular use contemplated. It is intended that the scope of the invention be defined by the claims appended hereto.

What is claimed is:

1. An energy transfer, current amplifying device comprising:
- an inductor coil comprising a plurality of inductor elements for storing magnetic energy;
- an energy source switchably connected to a first side of said inductor coil for supplying an energizing current to said coil;
- a load inductor, a first side of which is connected to said inductor coil and operable to receive current flowing in said inductor coil;
- contact means operable to effectively connect said first side of said inductor coil to said load inductor to form a current carrying circuit between said inductor coil and load inductor and to thereafter progressively disconnect at least some of said elements of said inductor coil from said circuit, thereby increasing the magnitude of the current in said circuit.

2. An energy transfer, current amplifying device comprising:
- an inductor coil comprising a plurality of inductor elements for storing magnetic energy;
- an energy source switchably connected to a first side of said inductor coil for supplying an energizing current to said coil;
- a load inductor coupled to said inductor coil and operable to receive a current proportional to the current flowing in said inductor coil;
- contact means operable to form a closed circuit effectively coupling a side of said inductor coil to said load inductor and to progressively disconnect at least some of said elements of said inductor coil from said circuit, thereby increasing the magnitude of the current in said circuit.

3. An energy transfer, current amplifying device comprising:
- an inductor coil (500) comprising a plurality of inductor elements for storing magnetic energy;
- an energy source switchably connected to said inductor coil for supplying an energizing current to said coil;
- a load inductor (530) coupled to said inductor coil for receiving energy from said inductor coil;
- said load inductor being coupled to said inductor coil by an energy transfer means (520) including contact means (510) operable to progressively transfer the energy from said inductor coil to said load inductor to thereby progressively increase the magnitude of a current flowing in said load inductor.

4. The energy transfer, current amplifying device of claims 1 or 2, wherein said contact means is also operable to progressively transfer energy from the load inductor to the inductor coil.

5. The energy transfer, current amplifying device of claim 3, wherein said energy transfer means is also operable to progressively transfer energy from the load inductor to the inductor coil.

6. The current amplifier of claim 4, wherein said contact means comprises means for progressively connecting a first inductor element of said inductor coil to said load inductor, then connecting a second inductor element of said inductor coil immediately adjacent said first inductor element to said load inductor followed by disconnecting said first inductor element from said load inductor while leaving said second inductor element connected to said load inductor.

7. The current amplifier of claim 1, wherein the inductor coil is directly coupled to the load inductor.

8. The current amplifier of claim 1, wherein the inductor coil is magnetically coupled to the load inductor.

9. The current amplifier of claim 8, wherein the inductor coil is magnetically coupled to the load inductor by a transformer.

10. The current amplifier of claim 2 wherein the inductor coil is magnetically coupled to the load inductor.

11. The current amplifier of claim 7, 8, 3 or 10 wherein said contact means is a sliding contact.

12. The current amplifier of claim 7 or 9, 3 or 10 wherein said contact means is a switch means.

13. The current amplifier of claim 7, 9 or 10 wherein said inductor elements each have an associated tap cooperating with said contact means.

14. The current amplifier of claim 3, wherein said energy transfer means comprises a transformer having at least a secondary winding and a primary winding and wherein said primary winding comprises a second plurality of inductor elements, each of which have an associated tap means for cooperating with said contact means.

15. The current amplifier of claim 7, wherein said contact means comprises means for progressively contacting a first inductor element of said inductor coil to said load inductor, then connecting a second inductor element of said inductor coil immediately adjacent said first inductor element to said first inductor element concurrently with connecting both of said first and second inductor elements to said load inductor followed by disconnecting said first inductor element from said load inductor while leaving said second inductor element connected to said load inductor.

16. The current amplifier of claim 14, wherein said contact means comprises means for progressively connecting a first inductor element of said primary winding to said inductor coil, then connecting a second inductor element of said primary winding immediately adjacent said first inductor element of said primary winding to said first inductor element of said primary winding concurrently with connecting both of said first and second inductor elements of said primary winding to said inductor coil followed by disconnecting said inductor coil from said first inductor element of said primary winding and leaving said second inductor element of said primary winding connected to said inductor coil.

17. The current amplifier of claim 12, wherein said switch means is a mechanical switching means.

18. The current amplifier of claim 12, wherein said switch means is an electromechanical switching means.

19. The current amplifier of claim 12, wherein said switch means is a semiconductor switching means.

20. The current amplifier of claim 12, wherein said inductor coil is a superconducting coil and said switch means is a superconducting switching means.

21. The current amplifier of claim 12, wherein said inductor coil is non-superconducting and said switch means is a superconducting switch means.

22. The current amplifier of claim 12, wherein said inductor coil is superconducting and said switch means is a non-superconducting switch means.

23. A current amplifying apparatus comprising:
- a current source;
- an inductor coil comprising a plurality of individual induction elements, said inductor coil having a first end and a second end, and a longitudinal axis;
- a first conductor having one end switchably connected by means of a first switch to said first end of said inductor coil, said first conductor being disposed substantially coaxially with the longitudinal axis of said inductor coil, a second end of said first conductor being switchably connected to said current source to transfer energy from said current source to said inductor coil;
- a load switchably connected by means of said first switch, between said inductor coil and said first conductor;
- a plurality of second conductors disposed circumferentially about said first conductor and radially spaced therefrom, said second conductors being disposed generally parallel to said longitudinal axis of said inductor coil;

means for electrically connecting each of said plurality of second conductors to said first conductor thereby providing a current path through said second conductors; and means for progressively connecting said induction coil elements to said plurality of said second conductors starting at a position generally adjacent to said first end of said inductor coil and progressing towards said second end of said inductor coil to thereby progressively disconnect said induction elements from said first conductor and increasing the current in the remaining induction elements of said inductor coil.

24. The current amplifying apparatus of claim 19 including means disposed intermediate said second conductors for shearing said coil conductors.

25. The current amplifying apparatus of claim 24, wherein said means for progressively connecting portions of said coil conductor to said plurality of second conductors comprises a detonatable explosive charge disposed along the length of said inductor coil and adapted to be detonated beginning generally adjacent said first end of said coil whereby said inductor coil is caused to progressively make electrical contact with said second conductors and said means for shearing said coil.

26. A process of amplifying a current comprising the steps of:

providing electrical energy to an inductor coil comprising a plurality of closely coupled inductor elements for storing magnetic energy;

connecting the inductor coil in a circuit with a load inductor; and progressively transferring the magnetic energy stored in the inductor elements to said load inductor.

27. The method of claim 26 including the step of directly coupling a first side of said load inductor to said inductor coil.

28. The method of claim 26 including the step of magnetically coupling, with a transformer, said load and inductor coil.

29. The method of claim 27 wherein the step of progressively transferring further comprises the step of disconnecting serially connected individual inductor elements of a primary winding of said transformer from said inductor coil.

30. The method of claim 27, wherein the step of progressively transferring further comprises progressively and sequentially disconnecting said inductor elements from said circuit.

31. The process for amplifying a current as claimed in claim 30, wherein said step of progressively electrically disconnecting individual inductor elements of said inductor coil from said circuit comprises:

connecting a first inductor element of said inductor coil to a side of said load inductor electrically distal from said inductor coil;

connecting said first inductor element to a second inductor element immediately adjacent said first inductor element concurrently with connecting both said first and said second inductor elements to said side of said load inductor, said second inductor element being electrically closer to said load inductor than said first inductor element; and disconnecting said first inductor element from said load inductor while continuing to connect said second inductor element to said load inductor.

32. The process for amplifying a current as claimed in claim 29, wherein said step of progressively electrically disconnecting individual inductor elements of said primary winding comprises:

connecting a first inductor element of said primary winding to a side of said inductor coil;

connecting said first inductor element to a second inductor element immediately adjacent said first inductor element concurrently with connecting both said first and said second inductor elements to said inductor coil; and disconnecting said first inductor element from said inductor coil while continuing to connect said second inductor element to said inductor coil.

33. The method of claim 26 further comprising the step of reversing the connecting of said stored energy to said load for transferring energy from said load inductor to said inductor coil.

34. A process of amplifying a current comprising the steps of:

passing an electric current through a plurality of series connected, mutually coupled inductor elements to thereby store magnetic energy therein;

electrically connecting a load inductor to said inductor elements; and progressively transferring the magnetic energy stored in said inductor elements to said load inductor by sequentially disconnecting mutually coupled inductor elements from said load inductor.

35. The process of claim 34, wherein said inductor elements are sequentially disconnected in a make before brake switching operation whereby current flowing to the load inductor is increased.

36. The process of claim 35, including the step of progressively transferring energy from the load inductor to the inductor elements by reversing the switching operations.

* * * * *